US008862995B1

(12) United States Patent
Kuhne et al.

(10) Patent No.: US 8,862,995 B1
(45) Date of Patent: Oct. 14, 2014

(54) AUTOMATICALLY CREATING A MOVIE FROM GEO LOCATED CONTENT USING EARTH

(75) Inventors: Stefan B. Kuhne, San Jose, CA (US); Vermont T. Lasmarias, Fremont, CA (US); Quarup S. Barreirinhas, San Francisco, CA (US)

(73) Assignee: Google Inc., Mountain View, CA (US)

( * ) Notice: Subject to any disclaimer, the term of this patent is extended or adjusted under 35 U.S.C. 154(b) by 17 days.

(21) Appl. No.: 13/289,270

(22) Filed: Nov. 4, 2011

(51) Int. Cl.
G06F 3/00 (2006.01)
G06F 17/30 (2006.01)

(52) U.S. Cl.
CPC .... *G06F 17/30817* (2013.01); *G06F 17/30843* (2013.01); *G06F 17/30268* (2013.01); *G06F 17/30858* (2013.01); *G06F 17/30056* (2013.01)
USPC ............ 715/723; 715/726; 715/730; 715/731

(58) Field of Classification Search
CPC .................... G06F 17/30817; G06F 17/30843; G06F 17/30858; G06F 17/30056; G06F 17/30268
USPC .................................. 715/723, 726, 730, 731
See application file for complete search history.

(56) References Cited

U.S. PATENT DOCUMENTS

| 2002/0152117 | A1* | 10/2002 | Cristofalo et al. ............... 705/14 |
| 2004/0267816 | A1* | 12/2004 | Russek ....................... 707/104.1 |
| 2008/0040474 | A1* | 2/2008 | Zuckerberg et al. .......... 709/224 |
| 2008/0214145 | A1* | 9/2008 | Howard et al. ............. 455/412.1 |
| 2008/0229248 | A1* | 9/2008 | Fagans et al. ................. 715/838 |
| 2008/0235585 | A1* | 9/2008 | Hart et al. ...................... 715/717 |
| 2008/0294990 | A1* | 11/2008 | Morris et al. .................. 715/719 |
| 2009/0276711 | A1* | 11/2009 | Figueroa ....................... 715/719 |
| 2010/0171763 | A1* | 7/2010 | Bhatt et al. .................... 345/660 |
| 2011/0055283 | A1* | 3/2011 | Wallace et al. ............... 707/802 |
| 2011/0055284 | A1* | 3/2011 | Wallace et al. ............... 707/802 |
| 2011/0280476 | A1* | 11/2011 | Berger et al. ................. 382/163 |
| 2011/0283210 | A1* | 11/2011 | Berger et al. ................. 715/765 |

OTHER PUBLICATIONS

Apple, Inc., Aperture 3 Exploring Aperturing, Oct. 25, 2010, Apple, Inc., pp. i-160.*
Zheng et al., "Tour the World: building a web-scale landmark recognition engine", 2009, IEEE, pp. 1085-1092.*
Gao et al., "W2Go: A Travel Guidance System by Automatic Landmark Ranking", Oct. 25-29, 2010, ACM, pp. 1-10.*

* cited by examiner

*Primary Examiner* — Patrick Riegler
*Assistant Examiner* — Nicholas Klicos
(74) *Attorney, Agent, or Firm* — Dority & Manning, P.A.

(57) ABSTRACT

Systems, methods, and computer storage mediums for rendering a geo-referenced interactive tour using media objects associated with a user. An exemplary method includes collecting the media objects from one or more selected user profiles associated with the user. Each media object is collected based on an associated time value. The collected media objects are organized into one or more trip segments based on velocity value associated with each collected media object, the velocity value indicating the velocity of travel between two media objects. At least one trip segment is rendered into the interactive tour. The trip segment is rendered to include its media objects and geo-referenced data. The geo-referenced data is determined from at least one geolocation associated with a media object included in the trip segment. The media objects and geo-referenced data are rendered according to a presentation style that is selected based on the included media objects.

32 Claims, 5 Drawing Sheets

400

| Duration | Segment | Presentation Style |
| --- | --- | --- |
| 410 — 4 Seconds | Segment 1 | Geo-Referenced Data: 3D geographic path from end point to Segment 2's start point |
| 420 — 10 Seconds | Segment 2 | Title: Microblog1<br><br>Geo-Referenced Data: 3D geographic path from start point to end point<br><br>Photo Effect: Slide show |
| 430 — 26 Seconds | Segment 3 | Title: Microblog2<br><br>Geo Referenced Data: 3D geographic scene encompassing start point and end point<br><br>Photo Effect: Grid of photos |
| 440 — 20 Seconds | Segment 4 | Title: Microblog3<br><br>Geo-Referenced Data: 3D geographic path from start point to end point through each geolocation<br><br>Photo Effect: Photo at each geolocation |

FIG. 4

AUTOMATICALLY CREATING A MOVIE FROM GEO LOCATED CONTENT USING EARTH

FIELD OF THE INVENTION

The field of the invention generally relates to creating an interactive three dimensional tour that can be rendered to a digital video.

BACKGROUND

Systems currently exist that allow a user to collect and share digital media. These systems allow the user to upload digital media to the user's profile on a website. The user can choose to share some or all of the digital media with other users. These systems also allow a user to post information that can also be shared with other users. Users wishing to view the media posted from other users must navigate to each website hosting the media and view the user's profile.

BRIEF SUMMARY

As a user travels to, and about a destination, the digital media created while traveling is not easily merged together and shared in an easy-to-distribute format. The embodiments described herein provide systems and methods that allow a user to create an interactive tour and post a digital video of the tour. Both the interactive tour and the digital video include digital media that the user posted or stored to various media websites. They are generated by collecting media from the user's profile(s) that are hosted by various media sources, organizing the media into segments based on date or time, and rendering the segments according to a presentation style.

The embodiments described herein include systems, methods, and computer storage mediums for rendering a geo-referenced interactive tour using media objects associated with a user. An exemplary method includes collecting the media objects from one or more selected user profiles associated with the user. Each user profile hosts one or more media objects stored on a media source. A media object is collected when a time value associated with the media object falls within a time range. The collected media objects are then organized into one or more trip segments based a velocity value associated with each collected media object. The velocity value indicates the velocity of travel between two media objects and the trip segments describe the user's movement between geolocations associated with the media objects. At least one trip segment is rendered into an interactive tour. The trip segment is rendered to include its media objects and geo-referenced data according to a presentation style that is selected, in part, based on the included media objects. The geo-referenced data is determined from at least one geolocation associated with a media object included in the trip segment.

Further features and advantages of the embodiments described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

FIG. 4 illustrates an exemplary storyboard that represents a geo-referenced digital video that is generated according to an embodiment.

DETAILED DESCRIPTION

In the following detailed description, references to "one embodiment," "an embodiment," "an example embodiment," etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

The embodiments described herein make reference to a "media object." Media objects include, but are not limited to, photographic images, digital videos, microblog and blog posts, audio files, documents, text, or any other type of digital media. A person of skill in the art will readily recognize the types of data that constitute media objects.

This Detailed Description is divided into sections. The first and second sections describe example system and method embodiments that may be used to generate a geo-referenced digital video using media objects associated with a user. The third section describes an exemplary group of trip segments organized by an embodiment. The fourth section describes an exemplary storyboard that represents a digital video that is generated according to an embodiment. The fifth section describes an example computer system that may be used to implement the embodiments described herein.

Example System Embodiments

Figure 1:
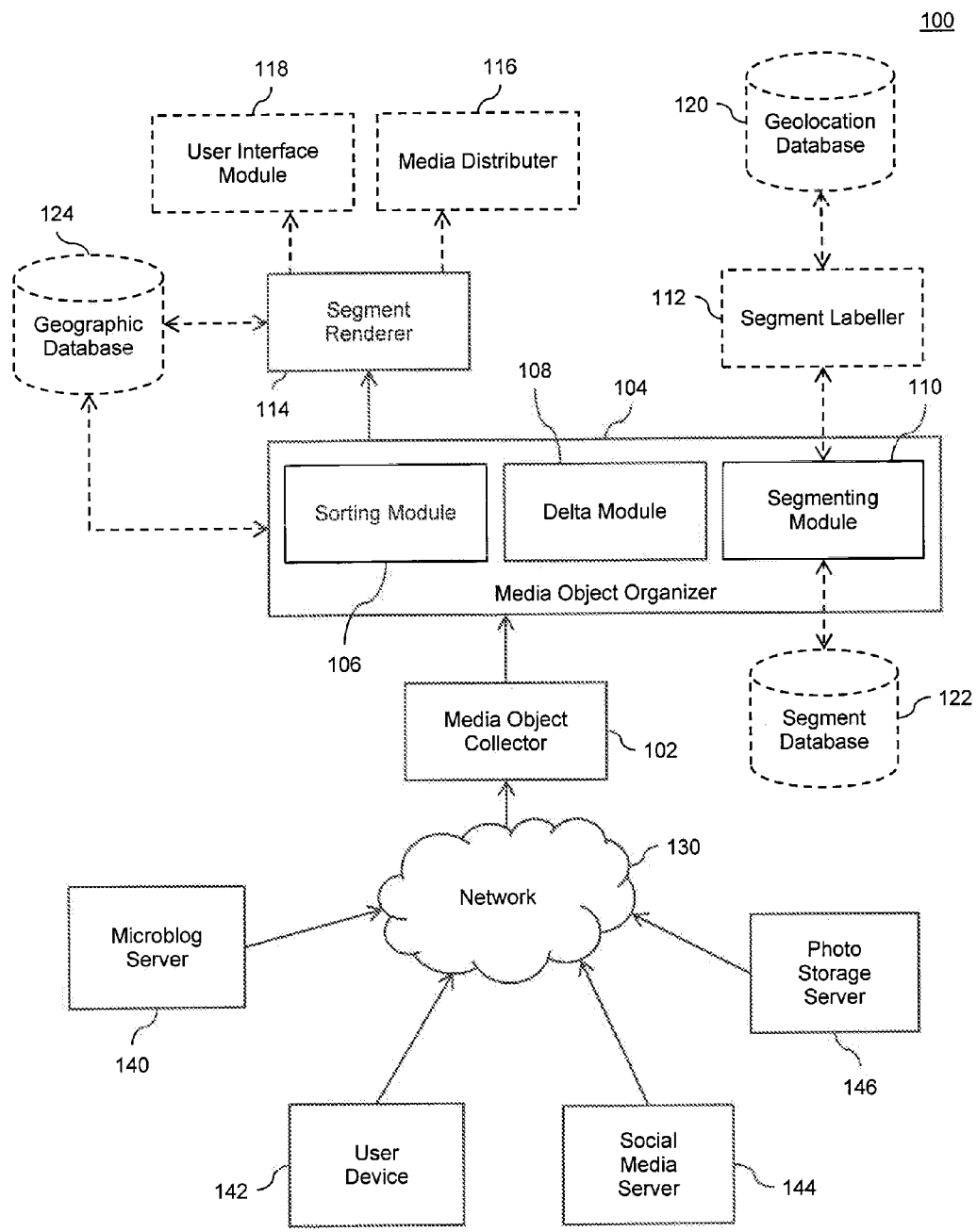
FIG. 1 illustrates an example system environment that may be used to generate a geo-referenced interactive tour using media objects associated with a user.

FIG. 1 illustrates an example system environment 100 that may be used to generate a geo-referenced interactive tour using media objects associated with a user. System 100 may also be used to generate a geo-referenced digital video. System 100 includes media object collector 102, media object organizer 104, segment labeller 112, segment renderer 114, media distributer 116, user-interface module 118, geolocation database 120, segment database 122, geographic database 124, network 130, microblog server 140, user device 142, social media server 144, and photo storage server 146. Media object organizer 104 includes sorting module 106, delta module 108, and segmenting module 110.

Network 130 can include any network or combination of networks that can carry data communication. These networks can include, for example, a local area network (LAN) or a wide area network (WAN), such as the Internet. LAN and WAN networks can include any combination of wired (e.g., Ethernet) or wireless (e.g., Wi-Fi, 3G, or 4G) network components.

Microblog server 140, user device 142, social media server 144, and photo storage server 146 can be implemented on any computing device capable of capturing, creating, storing, sharing, distributing, or otherwise transmitting media objects. These devices can include, for example, stationary computing devices (e.g., desktop computers), networked servers, and mobile computing devices such as, for example, tablets, smartphones, or other network enabled portable digital devices. Computing devices may also include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet or mobile computing device), rack server, set-top box, or other type of computer system having at least one processor and memory. Microblog server 140, user device 142, social media server 144, and photo storage server 146 can also each store user profiles associated with the user.

Media object collector 102, media object organizer 104, sorting module 106, delta module 108, segmenting module 110, segment labeller 112, segment renderer 114, media distributer 116, user-interface module 118, geolocation database 120, segment database 122, and geographic database 124 can be implemented on any computing device. Each component, module, or database may further run on single computing device or a distribution of computer devices.

A. Media Object Collector

Media object collector 102 is configured to collect media objects from one or more selected user profiles associated with the user. The media objects are collected in a way that respect the user's privacy and sharing settings included in each user profile. The user profiles can be selected from any media source that utilizes user profiles to store, distribute, or share media objects. Such media sources include, for example, microblog server 140, user device 142, social media server 144, and photo storage server 146. In some embodiments, media object collector 102 collects media objects from a group of profiles based on the type of media objects available from the media source. In some embodiments, media object collector 102 retrieves only a specific type of media object from a group the user's profiles. In some embodiments, media object collector 102 collects the media objects by creating a list that includes the media objects and a description where each media object is located. The description can include, for example, a URL, a filename, or another type of address, locator, or link.

The media objects are collected based on an associated time value. The time value is normally determined based on when the media object is created. For example, if the media object is a photographic image, the time value will indicate when the photographic image is captured. If the media object is a microblog post, the time value will indicate when the post is received by, for example, microblog server 140, and added to a user's profile. A person of skill in the art will readily understand an appropriate time value for each type of media object. The time value may also be based on some other event such as, for example, when a media object is modified. In some embodiments, media objects are collected based on whether their associated time values fall within a specific duration. The duration can be provided by the user or can be based on, for example, a specific day, week, month, or year.

B. Media Object Organizer

Media object organizer 104 is configured to organize the collected media objects into one or more trip segments. Each trip segment depicts the user moving from a first geolocation to a second geolocation. Each trip segment is organized based on a velocity value associated with each collected media object. The velocity value is calculated using a time value and a geolocation associated with each collected media object. In some embodiments, the media objects are organized into trip segments using segmenting module 110, described below.

In some embodiments, media object organizer 104 is also configured to collect geo-referenced data for each trip segment. The geo-referenced data depicts the user traveling between the geolocations associated the media objects included in each trip segment. The geo-referenced data can include, for example, 3D imagery, maps, addresses, panoramic or other photographic images, location names, or other geo-referenced data. In some embodiments, the geolocations associated with the first and last media object included in each trip segment are used to collect geo-referenced data from a geographic information system such as, for example, geographic database 124.

In some embodiments, media object organizer 104 is also configured to organize at least one trip segment based on the user profile that hosted a media object. For example, media object organizer 104 can organize media objects collected from the same user profile into the same trip segment.

Media object organizer 104 includes sorting module 106, delta module 108, and segmenting module 110. These modules may be utilized to organize the collected media objects into one or more trip segments. These modules, however, are not intended to limit the embodiments. Consequently, one of skill in the art will readily understand how the functionality of each module may be implemented by using one or more alternative modules or configurations.

Media object organizer 104 may be further configured to carry out the embodiments described in U.S. patent application Ser. No. 13/289,244, filed on the same date, incorporated herein in its entirety.

1. Sorting Module

In some embodiments, sorting module 106 is configured to sort the media objects based on the time value associated with each media object, prior to the media objects being organized into trip segments. The time value may be included in metadata associated with each media object. In some embodiments, the time value includes separate date and time values. In some embodiments, the time value includes a value that indicates time relative to a starting date and time. In some embodiments, the time value may adjust automatically for time zones and locality specific changes such as, for example, daylight saving time.

In some embodiments, sorting module 106 will sort the media object in chronological order from oldest to newest based on the time value. In some embodiments, sorting module 106 will sort the media objects in reverse chronological order. In some embodiments, sorting module 106 will sort the media objects based on similar creation times distinct from the creation date.

These embodiments are merely exemplary and are not intended to limit sorting module 106.

2. Delta Module

In some embodiments, delta module 108 is configured to determine a delta between adjacent sorted media object. The delta includes a distance value describing the distance between adjacent media objects. The distance value between adjacent media objects is based on a difference between the geolocation associated with adjacent media object. For example, a collection of sorted media objects may include object1, object2, object3, etc. Delta module 108 can determine a distance value between object1 and object2 by finding the difference between the geolocations associated with object1 and object2. A similar determination can be made between each two adjacent media objects.

The geolocation associated with each media object can include, for example, latitude/longitude coordinates, addresses, or any other coordinate system. The geolocation can also include altitude values. In some embodiments, the geolocation for each media object is based on where the media object was created. For example, if the media object is a photographic image, the geolocation is based on where the image was captured. If the media object is an audio file, the geolocation is based on where the audio file was recorded. If the media object is a blog post, the geolocation is based on a user's location when creating the blog post. In some embodiments, the geolocation is set or modified based on user input.

In some embodiments, the geolocation is determined by a computer device used to create the media object. These computer devices can utilize location services such as, for example, global positioning system (GPS) services or a network based location service. In some embodiments, the geolocation is based on user input. In some embodiments, a combination of user input and a location service are utilized.

In some cases, not all media objects include a geolocation. For these cases, a number of methods may be used to supplement those media objects missing a geolocation. In some embodiments, each media object without a geolocation may copy a geolocation from an adjacent media object based on a duration between the time value. For example, if object2, described above, does not include a geolocation, it may utilize the geolocation from either object1 or object3, depending on which object was created within a shorter duration. If object1 and object3 have no geolocation, object 2 can utilize the geolocation from the next closest adjacent media object with a geolocation. In some embodiments, delta module 108 may be configured to skip over media objects missing geolocations and determine a distance value only between the closest adjacent media object with a geolocation.

In some embodiments, delta module 108 also determines a velocity value. The velocity value is based on the duration between the time values and the distance value between geolocations associated with each two adjacent media objects. The velocity value is intended to show the speed at which the user travels between the geolocations associated with adjacent media object. For example, if the distance value between object1 and object2 is 60 miles and the duration between object1 and object2 is one hour, the velocity value between object1 and object2 is 60 miles per hour. The velocity value may be represented in any appropriate format and is not limited to the foregoing example.

In some embodiments, a velocity value is used to determine a mode of transportation between adjacent media objects. For example, a velocity value over 100 miles per hour may indicate that the mode of transportation is an airplane. A velocity value between 20 miles per hour and 100 miles per hour may indicate that the mode of transportation is an automobile. A velocity value between 5 miles per hour and 20 miles per hour may indicate that the mode of transportation is a bicycle. A velocity value between 1 mile per hour and 5 miles per hour may indicate that the mode of transportation is walking or hiking. And, a velocity value under 1 mile per hour may indicate that the mode of transportation is mostly stationary. These velocity ranges may be modified to include other modes of transportation and are not intended to limit the embodiments in any way.

3. Segmenting Module

In some embodiments, segmenting module 110 is configured to organize the sorted media objects into one or more trip segments based on the velocity value between adjacent media objects. This process can occur after delta module 108 determines a velocity value between adjacent media objects. In some embodiments, the media objects are organized into trip segments based on similar velocity values. In some embodiments, the media objects are organized into trip segments based on velocity value ranges. For example, as segmenting module 110 scans the sorted media objects, it encounters a contiguous group of media objects with velocity values between 20 and 100 miles per hour. This group of media objects is included into a first trip segment. Segmenting module 110 then encounters a velocity value between a first and second media object that is 10 miles per hour. When this velocity value is encountered, segmenting module 110 will begin a new trip segment that will include the second media object and all adjacent contiguous media objects with velocity values between 5 and 20 miles per hour. This process will continue until each media object is included in a trip segment.

In some embodiments, segmenting module 110 is further configured to merge a smaller trip segment with an adjacent trip segment based on the accuracy of the geolocation associated with each media object included in the smaller trip segment. For example, if a geolocation associated with a media object results in a velocity value that is inconsistent with neighboring velocity values, segmenting module 110 will merge the media object with a neighboring trip segment. If the resulting neighboring trip segments have velocity values within the same range, segmenting module 110 may also merge these trip segments.

In some embodiments, segmenting module 110 will store each trip segment in, for example, segment database 122.

C. Segment Renderer

In some embodiments, segment renderer 114 is configured to render at least one trip segment into an interactive tour. The interactive tour allows a user to, for example, select a media object, navigate along a path displayed with the geo-referenced data, or interact with the geo-referenced data. In some embodiments, segment rendered 114 is configured to render the interactive tour in a digital video. In some embodiments, segment renderer 114 is configured to render at least one trip segment into a digital video.

The trip segment is rendered to include its media objects and geo-referenced data. The geo-referenced data is determined from at least one geolocation associated with a media object included in the trip segment. In some embodiments, the geo-referenced data includes a map that pans between the geolocations associated one or more media objects included in the trip segment. In some embodiments, the geo-referenced data includes a movie of a virtual 3D landscape navigating a virtual path between the geolocations associated with one or more media objects included in the trip segment. In some embodiments, the geo-referenced data includes a photographic image capturing at least one geolocation associated with a media object included in the trip segment. In some embodiments, the geo-referenced data includes labels, addresses, or coordinates that correspond to the geolocation associated with one or more media objects included in the trip segment.

Each trip segment is rendered according to a presentation style selected, in part, based on the media objects included in the trip segment. Presentation styles describe how media objects are presented in the rendered trip segment. The presentation styles also describe how media objects are presented in conjunction with the geo-referenced data. Presentation styles can determine, for example, how photographic images, audio files, text, and other media objects are presented in the video segment. For example, if a trip segment includes photographic images and a microblog post, a presentation style can be selected that uses the microblog post for a title and displays the photographic images as a slideshow in the rendered trip segment. If the trip segment includes geo-referenced data that shows a path between geolocations within a 3D geographic environment, a presentation style may be selected that overlays each photographic image at its geolocation along the path.

In some embodiments, presentation styles for each rendered trip segment are selected automatically based on the media objects included in the trip segment. In some embodiments, the presentation style of at least one rendered trip segment is selected by the user. In some embodiments, the presentation styles can be modified by the user.

In some embodiments, segment renderer 114 is also configured to determine a segment duration for at least one trip segment based on the duration between time values associated with the included media objects. The segment duration determines the duration of the rendered trip segment when rendering a digital video. For example, if the media objects span a duration of three hours, segment renderer 114 will determine how much of the digital video's duration to dedicate to the rendered trip segment. In some embodiments, the segment duration allotted to the rendered trip segment can be further determined based on the duration between media objects in other trip segments. In some embodiments, the segment duration can be selected by the user.

D. Media Distributer

In some embodiments, system 100 includes media distributer 116. Media distributer 116 may be configured to distribute an interactive tour, a digital video, or both to one of the user's profiles that is viewable by a plurality of other users. Both the interactive tour and the digital video can be provided as, for example, data streaming through an internet browser over network 130 or a downloadable digital file.

E. Segment Labeller

In some embodiments, system 100 includes segment labeller 112. Segment labeller 112 is configured to label a trip segment based on the geolocation associated with at least one media object included in the trip segment. Segment labeller 112 may utilize reverse geocoding to determine a label based on the geolocation. Labels can include, but are not limited to, location names, business names, political designations, addresses, or any other label that can be determined based on reverse geocoding. Labels can be retrieved from a database such as, for example, geolocation database 122. Geolocation database 122 can be any geographic information system such as, for example, geographic database 124. Geolocation database 122 may also be a stand-alone geographic information system for reverse-coding geolocations into labels.

In some embodiments, segment labeller 112 is further configured to label a trip segment based on the geolocation associated with the first and last media objects included in the trip segment. For example, if the first media object is created by the user at a first geolocation and, after traveling in an airplane, the user creates the last media object at a second geolocation, segment labeller 112 can utilize the first and last geolocations to derive a label that indicates airplane travel between the geolocations.

F. User-Interface Module

In some embodiments, system 100 includes user-interface module 118. User-interface module 118 is configured to receive a duration value. The duration value is used to determine a length of a digital video. The duration value can be provided to segment renderer 110 and used to determine how much time to dedicate to each rendered trip segment included in the digital video. In some embodiments, user-interface module 118 is also configured to allow a user to modify the duration of one or more trip segments.

In some embodiments, user-interface module 118 is also configured to receive a start time and an end time from a user that describe a time range. The time range may also include date ranges. In some embodiments, the time range is provided by the user. Media object collector 102 may utilize this time range to collect media objects. For example, if the user selects a time range consisting of a three day period, media object collector 102 can collect media objects from the selected user profiles based on whether the media objects' time values fall within the three day period. In some embodiments, the user can select a starting date and time and media object collector 102 will collect all media objects from the selected user profiles from the starting date and time to the user's present time.

In some embodiments, user-interface module 118 is also configured to allow a user to add or remove certain types of media objects. For example, if the user wishes to exclude microblog posts, user-interface module 118 may be configured to allow the user to exclude a single microblog post or multiple microblog posts based on, for example, date, time, media source, or keywords in the post.

Various aspects of embodiments described herein can be implemented by software, firmware, hardware, or a combination thereof. The embodiments, or portions thereof, can also be implemented as computer-readable code. The embodiment in system 100 is not intended to be limiting in any way.

Example Method Embodiments

Figure 2:
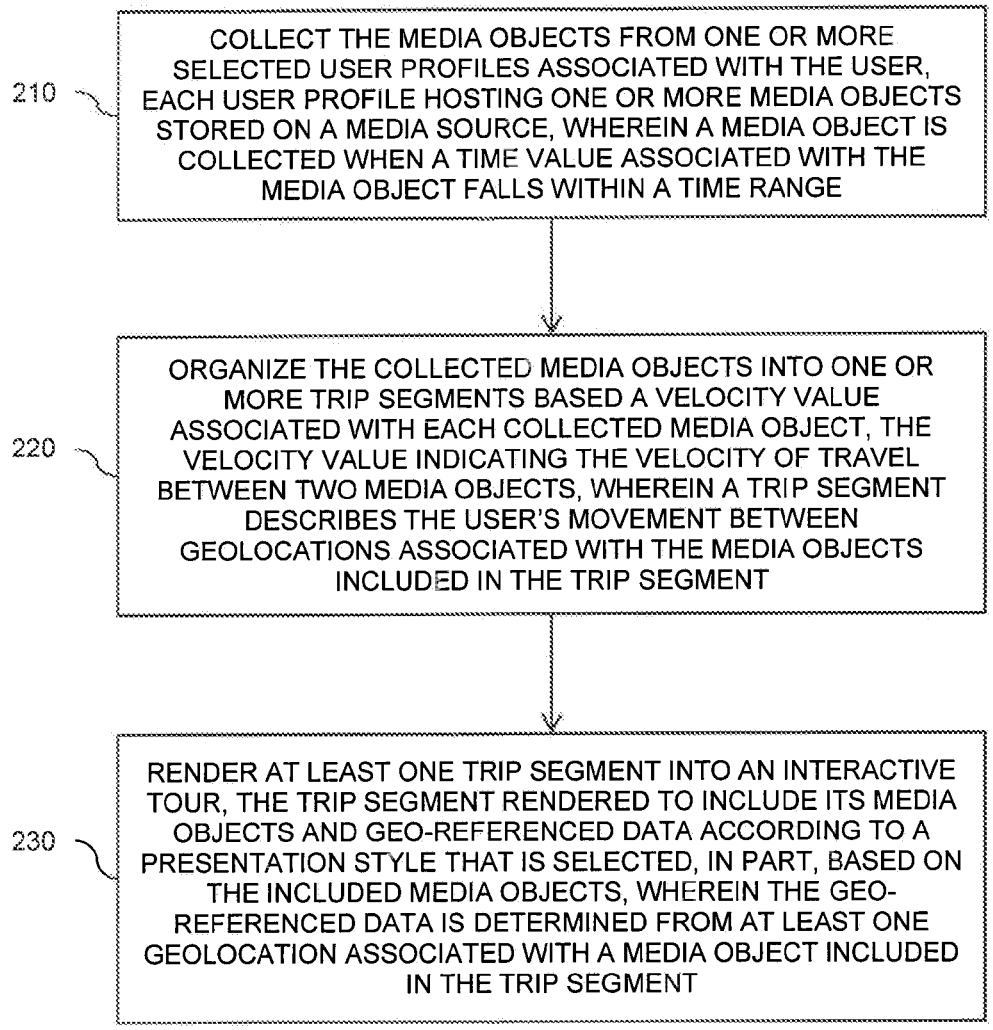
FIG. 2 is a flowchart illustrating an exemplary method that may be used to generate a geo-referenced interactive tour using media objects associated with a user.

FIG. 2 is a flowchart illustrating an exemplary method 200 that may be used to generate a geo-referenced interactive tour using media objects associated with a user. While method 200 is described with respect to an embodiment, method 200 is not meant to be limiting and may be used in other applications. Additionally, method 200 may be carried out by, for example, system 100.

Method 200 collects the media objects from one or more selected user profiles associated with the user (stage 210). Each user profile hosts one or more media objects that are stored on a media source. Media sources can include, for example, social media websites, photo sharing websites, and microblog websites. In some embodiments, the user profiles are selected by the user. In some embodiments, the user profiles are selected automatically based on which profile(s) the user accesses most often.

The media objects are collected based on a time value. For example, a media object can be selected based on whether its associated time value falls within a time range. In some embodiments, the time value includes both a date and a time. In some embodiments, the time value is represented as either an absolute or relative date and time. Stage 210 may be carried out by, for example, media object collector 102 embodied in system 100.

Method 200 then organizes the collected media objects into one or more trip segments (stage 220). Each trip segment is organized based on a velocity value associated with each collected media object. The velocity value is calculated using a time value and a geolocation associated with each collected media object. The geolocation indicates the user's path between geolocations. In some embodiments, before the media objects are organized into trip segments, they are sorted based on their time values. Once sorted, a velocity value between each adjacent media object is determined. The velocity values can then be used organize the media objects into trip segments. Each trip segment includes a first media object representing the start of the trip segment and a last media object representing the end of the trip segment. Stage 220 may be carried out by, for example, media object organizer 104 embodied in system 100.

Method 200 renders at least one trip segment into an interactive tour (stage 230). The trip segment is rendered to include its media objects and geo-referenced data. The geo-referenced data is determined from at least one geolocation associated with a media object included in the trip segment. The geo-referenced data depicts the user traveling between the geolocations associated with the first and last media objects. The geo-referenced data can include, for example, maps, 3D imagery, addresses, political designations, etc. The media objects and geo-referenced data are rendered according to a presentation style. The presentation style is selected, in part, based on the included media objects. Stage 230 may be carried out by, for example, media object organizer 104 or segment renderer 114 embodied in system 100.

Example Media Segments

Figure 3:
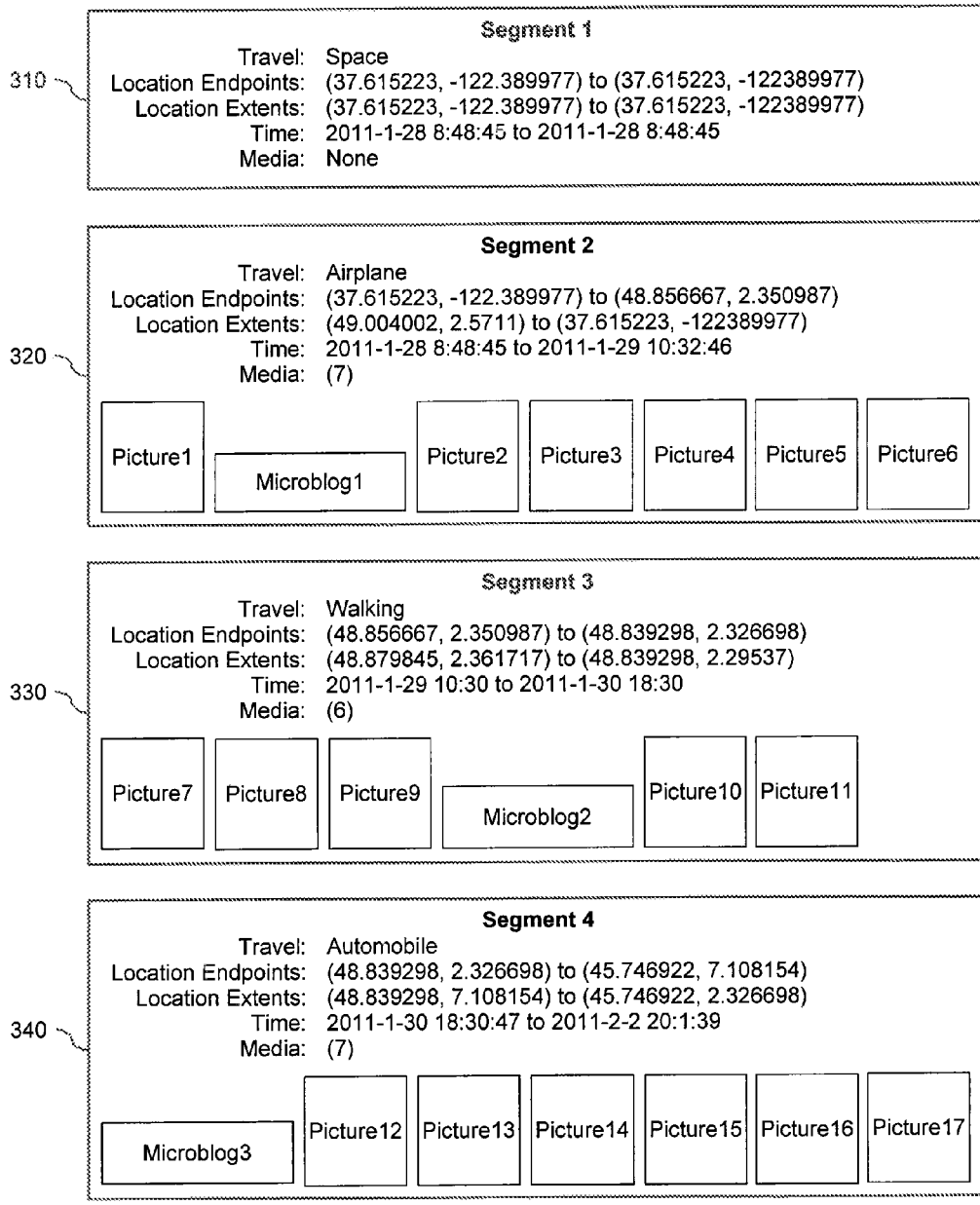
FIG. 3 illustrates an exemplary group of segments that is the result of organizing media objects according to an embodiment.

FIG. 3 illustrates an exemplary group of segments 300 that is the result of organizing media objects according to an embodiment. Segment group 300 includes segment 310, segment 320, segment 330, and segment 340. Each segment is organized based on the velocity value between each media object falling into a velocity range. Segment group 300 includes the media objects picture1 though picture17 and microblog1 through microblog3. Picture1 through picture17 are collected from the user's profiles on user device 142, social media server 144, and photo storage server 146. Micorblog1 through microblog3 are collected from the user's profile on microblog server 140. After the media objects are collected, they are sorted based their associated time values.

A distance value and a velocity value are then determined between adjacent media object. The media objects are then organized into trip segment based on the velocity value between each adjacent media object. Segment 310 is a default segment that may be included in some embodiments. It is intended to be used as a starting point for the digital video that includes segment group 300.

Segment 320 includes the media objects with velocity values above 100 miles per hour. This velocity value range indicates that an airplane was the most likely mode of transportation. Segment 330 includes the media objects with velocity values between 1 mile per hour and 5 miles per hour. This velocity value range indicates that walking was the most likely mode of transportation. Segment 340 includes media objects with velocity values between 20 miles per hour and 100 miles per hour. This velocity value range indicates that an automobile was the most likely mode of transportation.

Segment group 300 is provided as an example and is not intended to limit the embodiments described herein.

Example Video Layout

FIG. 4 illustrates an exemplary storyboard 400 that represents a geo-referenced digital video that is generated according to an embodiment. Storyboard 400 includes video segment 410, video segment 420, video segment 430, and video segment 440. Video segment 410 is rendered from trip segment 310 embodied in FIG. 3. Like trip segment 310, video segment 410 is provided as a default starting point. It includes a geo-referenced data movie that navigates from segment 310's end point to video segment 420's starting point along a 3D virtual landscape.

Video segment 420 is rendered from trip segment 320 embodied in FIG. 3. Video segment 420 is rendered according to a presentation style that is selected based on trip segment 320's mode of transportation being an airplane. The presentation style utilizes microblog1 as the title and presents the photographic images as a slideshow. The slideshow and title are overlaid on a geo-referenced digital movie that navigates between trip segment 320's starting and ending points along a virtual 3D geographic landscape. Video segment 320's duration is determined by comparing the duration between the time values of the media objects included in the other segments with the duration between the time values of trip segment 320's media objects.

Video segment 430 is rendered from trip segment 330 embodied in FIG. 3. Video segment 430 is rendered according to a presentation style that was selected based a combination of the mode of transportation being walking and numerous photographic images. The presentation style utilizes microblog2 as the title and presents the photographic images in a grid. The size and shape of the grid is chosen based on the number of photographic images included in trip segment 330. The photo grid and the title are overlaid on a geo-referenced digital movie that navigates around a central point that encompasses trip segment 330's starting and ending points. Video segment 430's duration is determined based on the duration between the time values associated with trip segment 330's media objects.

Video segment 440 is rendered from trip segment 340 embodied in FIG. 3. Video segment 440 is rendered according to a presentation style that is selected based on an automobile being the user's mode of transportation. The presentation style utilizes microblog3 as the title. The title is overlaid on a geo-referenced digital movie that navigates a path in a 3D virtual landscape. The path includes points on the landscape that correspond to each photographic image's geolocation. As each point is traversed along the path, its corresponding photographic image is displayed. Video segment 440's duration is determined based on the duration between the time values associated with trip segment 340's media objects.

Each video segment in storyboard 400 is combined to generate a digital video. The video segments may be combined by, for example, segment renderer 114 embodied in FIG. 1. Storyboard 400 is included only as an example and is not intended to limit the embodiments described herein.

Example Computer System

Figure 5:
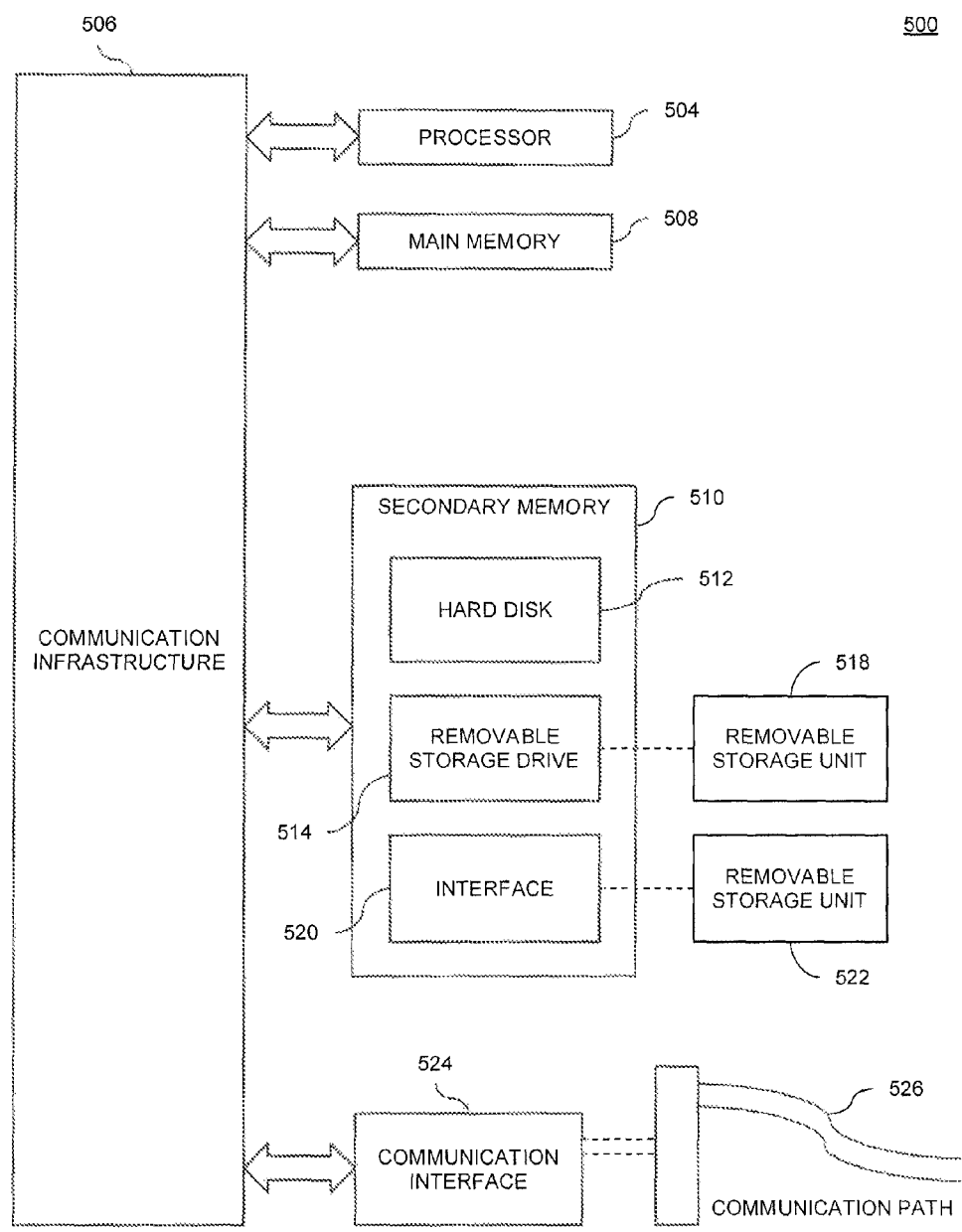
FIG. 5 illustrates an example computer in which embodiments of the present disclosure, or portions thereof, may be implemented as computer-readable code.

FIG. 5 illustrates an example computer system 500 in which embodiments of the present disclosure, or portions thereof, may be implemented. For example, media object collector 102, media object organizer 104, segment labeller 112, segment renderer 114, user-interface module 118, and media distributer 116 may be implemented in one or more computer systems 500 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 504 may be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, and removable storage drive 514. Removable storage drive 514 may include a floppy disk drive, a magnetic tape drive, an optical disk drive, a flash memory drive, or the like. The removable storage drive 514 reads from and/or writes to a removable storage unit 518 in a well-known manner. Removable storage unit 518 may include a floppy disk, magnetic tape, optical disk, flash memory drive, etc. which is read by and written to by removable storage drive 514. As will be appreciated by persons skilled in the relevant art, removable storage unit 518 includes a computer readable storage medium having stored thereon computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 518, removable storage unit 522, and a hard disk installed in hard disk drive 512. Computer storage medium and computer readable storage medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the embodiments described herein. In particular, the computer programs, when executed, enable processor device 504 to implement the processes of the embodiments, such as the stages in the methods illustrated by flowchart 200 of FIG. 2, discussed above. Accordingly, such computer programs represent controllers of computer system 500. Where an embodiment is implemented using software, the software may be stored in a computer storage medium and loaded into computer system 500 using removable storage drive 514, interface 520, and hard disk drive 512, or communications interface 524.

Embodiments of the invention also may be directed to computer program products including software stored on any computer readable storage medium. Such software, when executed in one or more data processing device, causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all exemplary embodiments as contemplated by the inventor(s), and thus, are not intended to limit the present invention and the appended claims in any way.

The foregoing description of specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for rendering a geo-referenced interactive tour comprising:
   collecting, using one or more computing devices, different types of media objects from one or more user profiles associated with a user, each user profile including one or more media objects stored on various media sources, wherein each media object of the one or more media objects is collected when a time value associated with the media object falls within a time range and wherein the collecting includes retrieving the different types of media objects from the one or more user profiles based at least on the types of media objects available from the various media sources, wherein the collected media objects are associated with a plurality of different geolocations;

organizing, using the one or more computing devices, the collected media objects into a plurality of trip segments based on a velocity value associated with each collected media such that the collected media objects are organized into different trip segments based on velocity value ranges associated with each respective trip segment, wherein each velocity value indicates the velocity of the user's movement between two collected media objects, wherein each velocity value is calculated based at least in part using the time values and geolocations associated with the two collected media objects, wherein each trip segment describes the user's movement between the geolocations associated with the collected media objects included in the trip segment;

selecting, using the one or more computing devices, from a plurality of different presentation styles, a presentation style for each trip segment based on the media object type included in each trip segment; and rendering, using the one or more computing devices, each trip segment into an interactive tour, each trip segment rendered to include its collected media objects and geo-referenced data according to the selected presentation style, wherein the geo-referenced data is determined from at least one geolocation associated with a collected media object included in the trip segment.

2. The computer-implemented method of claim 1, further comprising:
rendering, using the one or more computing devices, the interactive tour into a digital video, wherein the digital video includes a plurality of different video segments corresponding to the plurality of trip segments.

3. The computer-implemented method of claim 2, further comprising:
receiving, using the one or more computing devices, a duration value, wherein rendering the digital video further comprises rendering the digital video to a length specified by the duration value.

4. The computer-implemented method of claim 2, further comprising:
prior to rendering the digital video, determining, using the one or more computing devices, a segment duration for each trip segment based on the duration between time values associated with the included media objects, wherein the segment duration specifies the duration of time to allocate for each rendered trip segment during user interaction with the digital video.

5. The computer-implemented method of claim 2, further comprising:
distributing, using the one or more computing devices, the digital video to a user profile associated with a media source, wherein the user profile is viewable by a plurality of other users.

6. The computer-implemented method of claim 1, further comprising:
distributing, using the one or more computing devices, the interactive tour to a user profile associated with a media source, wherein the user profile is viewable by a plurality of other users.

7. The computer-implemented method of claim 1, further comprising:
labeling, using the one or more computing devices, a trip segment based on the geolocation associated with at least one media object included in the trip segment.

8. The computer-implemented method of claim 7, wherein the labeling is further based on the geolocation associated with a first media object and a last media object included in a trip segment.

9. The computer-implemented method of claim 1, wherein a trip segment is defined by a mode of transportation, the mode of transportation including one of flying, driving, walking, boating, biking, or remaining stationary, wherein the mode of transportation is determined from the velocity value associated with the included media objects.

10. A system for rendering a geo-referenced interactive tour comprising:
a computing device comprising a processor and a memory;
a media object collector module, implemented on the computing device and configured to collect different types of media objects from one or more user profiles associated with a user, each user profile including one or more media objects stored on various media sources, wherein each media object of the one or more media objects is collected when a time value associated with the media object falls within a time range and wherein the collecting includes retrieving the different types of media objects from the one or more user profiles based at least on the types of media objects available from the various media sources, wherein the collected media objects are associated with a plurality of different geolocations;
a media object organizer module, implemented on the computing device and configured to organize the collected media objects into a plurality of trip segments based on a velocity value associated with each collected media such that the collected media objects are organized into different trip segments based on velocity value range associated with each respective trip segment, wherein each velocity value indicates the velocity of the user's movement between two collected media objects, wherein each velocity value is calculated based at least in part using the time values and geolocations associated with the two collected media objects, wherein each trip segment describes the user's movement between the geolocations associated with the collected media objects included in the trip segment; and
a segment renderer module, implemented on the computing device and configured to select, from a plurality of different presentation styles, a presentation style for each trip segment based on the media object types included in each trip segment, render each trip segment into an interactive tour, each trip segment rendered to include its collected media objects and geo-referenced data according to the selected presentation style, wherein the geo-referenced data is determined from at least one geolocation associated with a collected media object included in the trip segment.

11. The system of claim 10, wherein the segment renderer is further configured to render the interactive tour into a digital video, wherein the digital video includes a plurality of different video segments corresponding to the plurality of trip segments.

12. The system of claim 11, further comprising:
a user-interface module configured to receive a duration value, wherein rendering the digital video further comprises rendering the digital video to a length specified by the duration value.

13. The system of claim 11, wherein the segment renderer is further configured to determine a segment duration for each trip segment based on the duration between time values associated with the included media objects, wherein the segment duration specifies the duration of time to allocate for each rendered trip segment during user interaction with the digital video.

14. The system of claim 11, further comprising:
a video distributer configured to distribute the digital video to a user profile associated with a media source, wherein the user profile is viewable by a plurality of other users.

15. The system of claim 10, further comprising:
a video distributer configured to distribute the interactive tour to a user profile associated with a media source, wherein the user profile is viewable by a plurality of other users.

16. The system of claim 10, further comprising:
a segment labeller configured to label a trip segment based on the geolocation associated with at least one media object included in the trip segment.

17. The system of claim 16, wherein the segment labeller is further configured to label the trip segment based on the geolocation associated with a first media object and a last media object included in a trip segment.

18. The system of claim 10, wherein a trip segment is defined by a mode of transportation, the mode of transportation including one of flying, driving, walking, boating, biking, or remaining stationary, wherein the mode of transportation is determined from the velocity value associated with the included media objects.

19. A non-transitory computer-readable storage medium having instructions encoded thereon that, when executed by a computing device, causes the computing device to perform operations comprising:
collecting different types of media objects from one or more user profiles associated with a user, each user profile including one or more media objects stored on various media sources, wherein each media object of the one or more media objects is collected when a time value associated with the media object falls within a time range and wherein the collecting includes retrieving the different types of media objects from the one or more user profiles based at least on the types of media objects available from the various media sources, wherein the collected media objects are associated with a plurality of different geolocations;
organizing the collected media objects into a plurality of trip segments based on a velocity value associated with each collected media such that the collected media objects are organized into different trip segments based on velocity value ranges associated with each respective trip segment, wherein each velocity value indicates the velocity of the user's movement between two collected media objects, wherein each velocity value is calculated based at least in part using the time values and a geolocation associated with the two collected media objects, wherein each trip segment describes the user's movement between the geolocations associated with the collected media objects included in the trip segment;
selecting, from a plurality of different presentation styles, a presentation style for each trip segment based on the media object types included in each trip segment; and
rendering each trip segment into an interactive tour, the trip segment rendered to include its collected media objects and geo-referenced data according to the selected presentation style wherein the geo-referenced data is determined from at least one geolocation associated with a collected media object included in the trip segment.

20. The computer-readable storage medium of claim 19, further comprising:
rendering the interactive tour into a digital video, wherein the digital video includes a plurality of different video segments corresponding to the plurality of trip segments.

21. The computer-readable storage medium of claim 20, further comprising:
receiving a duration value, wherein rendering the digital video further comprises rendering the digital video to a length specified by the duration value.

22. The computer-readable storage medium of claim 20, further comprising:
prior to rendering the digital video, determining a segment duration for each trip segment based on the duration between time values associated with the included media objects, wherein the segment duration specifies the duration of time to allocate for each rendered trip segment during user interaction with the digital video.

23. The computer-readable storage medium of claim 20, further comprising:
distributing the digital video to a user profile associated with a media source, wherein the user profile is viewable by a plurality of other users.

24. The computer-readable storage medium of claim 19, further comprising:
distributing the interactive tour to a user profile associated with a media source, wherein the user profile is viewable by a plurality of other users.

25. The computer-readable storage medium of claim 19, further comprising:
labeling a trip segment based on the geolocation associated with at least one media object included in the trip segment.

26. The computer-readable storage medium of claim 25, wherein the labeling is further based on the geolocation associated with a first media object and a last media object included in a trip segment.

27. The computer-readable storage medium of claim 19, wherein a trip segment is defined by a mode of transportation, the mode of transportation including one of flying, driving, walking, boating, biking, or remaining stationary, wherein the mode of transportation is determined from the velocity value associated with the included media objects.

28. A computer-implemented method for generating a geo-referenced digital video comprising:
collecting, using one or more computing devices, different types of media objects from one or more user profiles associated with a user, each user profile including hosting one or more media objects stored on various media sources, wherein each media object of the one or more media objects is collected when a time value associated with the media object falls within a time range and wherein the collecting includes retrieving the different types of media objects from the one or more user profiles based at least on the types of media objects available from the various media sources, wherein the collected media objects are associated with a plurality of different geolocations;

organizing, using one or more computing devices, the collected media objects into a plurality of trip segments based on a velocity value associated with each collected media such that the collected media objects are organized into different trip segments based on velocity value ranges associated with each respective trip segment, wherein each velocity value indicates the velocity of the user's movement between two collected media objects, wherein each velocity value is calculated based at least in part using the time values and geolocations associated with the two collected media objects, wherein a trip segment describes the user's movement between the geolocations associated with the collected media objects included in the trip segment;

selecting, using one or more computing devices, from a plurality of different presentation styles, a presentation style for each trip segment based on the media object types included in each trip segment; and rendering, using one or more computing devices, each trip segment into a digital video, the trip segment rendered to include its collected media objects and geo-referenced data according to the selected presentation style wherein the geo-referenced data is determined from at least one geolocation associated with a collected media object included in the trip segment.

29. The method of claim 1, wherein a presentation style is selected automatically, without user intervention.

30. The method of claim 1, wherein a presentation style is selected based on a user input.

31. The method of claim 1, wherein the interactive tour includes at least a 3-D virtual landscape navigation of a virtual path between the geolocations associated with one or more media objects included in the trip segment.

32. The system of claim 10, wherein the interactive tour includes at least a 3-D virtual landscape navigation of a virtual path between the geolocations associated with one or more media objects included in the trip segment.

\* \* \* \* \*

UNITED STATES PATENT AND TRADEMARK OFFICE
CERTIFICATE OF CORRECTION

PATENT NO. : 8,862,995 B1  
APPLICATION NO. : 13/289270  
DATED : October 14, 2014  
INVENTOR(S) : Kuhne et al.

Page 1 of 1

It is certified that error appears in the above-identified patent and that said Letters Patent is hereby corrected as shown below:

In the claims

Column 13, Line 16, after word "media", insert --object--.

Column 14, Line 44, after word "media", insert --object--.

Signed and Sealed this
Twenty-sixth Day of July, 2016

Michelle K. Lee
*Director of the United States Patent and Trademark Office*